United States Patent [19]
Aesch et al.

[11] Patent Number: 5,819,466
[45] Date of Patent: Oct. 13, 1998

[54] PERIPHERAL TERMITICIDE DELIVERY SYSTEM AND METHOD

[76] Inventors: Harold Aesch, 4247 Rocky Ridge Pl., Sanford, Fla. 32773; Kenneth Chitwood, 462 Lakeport Cove, Casselberry, Fla. 32707; Elizabeth Schmitt; Richard R. Schmitt, both of 8300 Murray Ct., Sanford, Fla. 32771

[21] Appl. No.: 877,182

[22] Filed: Jun. 17, 1997

Related U.S. Application Data

[63] Continuation-in-part of Ser. No. 762,345, Dec. 9, 1996.
[60] Provisional application No. 60/012,494 Feb. 29, 1996.

[51] Int. Cl.[6] ....................................... A01M 7/00
[52] U.S. Cl. ................... 43/123; 52/101; 52/404.2
[58] Field of Search ................ 43/124; 52/101, 52/404.2; 428/305.5

[56] References Cited

U.S. PATENT DOCUMENTS

| | | | |
|---|---|---|---|
| 3,602,248 | 8/1971 | Peacock | 43/124 |
| 4,028,841 | 6/1977 | Lundwall | 43/124 |
| 4,742,641 | 5/1988 | Cretti | 43/132.1 |
| 4,944,110 | 7/1990 | Sims | 43/124 |
| 5,184,418 | 2/1993 | Fletscher | 43/124 |
| 5,194,323 | 3/1993 | Savoy | 428/305.5 |
| 5,347,749 | 9/1994 | Chitwood et al. | 43/124 |
| 5,378,086 | 1/1995 | Campbell, Jr. et al. | 43/124 |
| 5,617,687 | 4/1997 | Bussey et al. | 52/404.2 |
| 5,678,362 | 10/1997 | Hulls et al. | 52/101 |

*Primary Examiner*—Michael J. Carone
*Assistant Examiner*—Fredrick T. French, III
*Attorney, Agent, or Firm*—Elsie C. Turner

[57] ABSTRACT

A peripheral termiticide delivery system of flexible apertured tubing is provided for injection under pressure of termiticide between the exterior walls of a building and its exterior coating. The tubing preferably has flanges extending therefrom whereby it is affixed to the walls around the building above ground level, and the apertures are protected from clogging by coating material. Injection ports for injection of termiticide into the tubing are disposed at intervals along the tubing, which ports are adapted to extend outside the exterior surfacing materials. Termiticide is injected under pressure into each port until all sections of tubing are filled to overflowing and termiticide exiting the apertures soaks the adjacent wall surfaces and runs down into the adjacent soil, creating a termite barrier. The system may be installed after construction by cutting a channel through the exterior coating, inserting the tubing into the channel and then reapplying exterior coating. Where foam material is sandwiched between the exterior framing and the exterior coating, whether as insulation, or as a form for poured concrete, the channel extends into the foam to a depth sufficient to introduce an effective chemical termite barrier within the foam.

11 Claims, 5 Drawing Sheets

PERIPHERAL TERMITICIDE DELIVERY SYSTEM AND METHOD

BACKGROUND OF THE INVENTION

This is a continuation-in-part of a formal application filed Dec. 9, 1996, Ser. No. 08/762,345, based on the specification and drawings submitted as a provisional application filed Feb. 29, 1996, Ser. No. 60/012,494.

This invention relates to a system for creation of chemical termite barrier around the exterior of a building above ground level, between exterior surfacing materials and the outside walls. The invention is adapted for both new and existing construction.

Although it is now common practice in the construction of new buildings to pre-treat the fill or soil area which is to underlie the foundation with a termiticide, the initial termite barrier does not last indefinitely, and there is a need to supplement this barrier during the life of the building by efficient and inexpensive means at the points where termites can gain access to wooden structural members. Termites do not bore holes through concrete. However they can gain entry into the areas where wood is used in the construction of the building by forming earthen tunnels from ground level over the surfaces of concrete foundations, slabs and walls. A common problem in buildings clad with exterior surfacing materials such as stucco, brick facing, or wood siding, is the ability of termites to build tunnels in the tiny spaces between the walls and the surfacing material, the tunneling activity going undetected because it is behind the surfacing material. The various surfacing materials used to clad the exterior walls are necessarily impenetrable to liquids used as solvents for termiticide substances, and there is rarely a good seal between the walls and the surfacing material that can keep out termites, which can enter tiny spaces as narrow as one sixty-fourth of an inch. In buildings having exterior cladding, the surfacing material frequently extends to or below ground level. Although wood siding would not be extended to ground level by a professional builder, frequently post-construction mulching and other landscaping activities may raise the soil level to the point where the wood siding is in contact or close proximity thereto. Thus is possible for termites to form their tunnels from below grade up the edges of a foundation slab and between the walls and the exterior coating material without being detected until after severe damage has been done to wooden structural members of the building. Accordingly, there is a continuing need for access to the surface of exterior walls beneath their exterior coating, so that termiticide can be applied to these surfaces.

It has been a widespread practice in the pest control industry, when termite infestation occurs between the exterior walls and the exterior surfacing, to remove a strip of the surfacing material around the building perimeter, extending from below grade to a height of six to nine inches above grade, thereby exposing the foundation and its junction with other structural features so that they may be easily inspected. This detracts from the aesthetic appearance of the structure.

Prior methods approved by the National Pest Control Association of preventing termites from entering between the exterior walls and the surfacing material involve saturating the soil with termiticide at the point of termite entry. This is accomplished by trenching or rodding. In the first of these methods, a trench is dug around the perimeter and filled with four gallons of termiticide per linear foot of trench. In the other method, termiticide is injected through a hollow rod jammed into the soil and against the foundation about every six inches or so. Usually the soil adjacent the foundation is relatively dry. Since dry soil does not absorb liquids easily, much of the termiticide is likely to drain of it very quickly, much like most of the water added to a dry flower pot. Thus much of the termiticide will be dispersed into areas where it is not effective at the point of termite entry, and where it likely creates an environmental detriment to beneficial creatures inhabiting the soil. Also, these methods being labor intensive, they entail substantial cost. Therefore, there is a need for an efficient, labor-saving termiticide delivery system for providing an effective termite barrier between the exterior cladding of a building and its foundation and exterior structural walls, whereby termiticide saturates the surfaces thereof down into the soil.

A recent development in the construction industry intended to conserve energy has been the use of rigid styrofoam or closed cell foamboard as insulation material installed on the exterior walls and foundation of a building and extending down the footing below grade to insulate the exteriors of basements or cellars. This rigid insulation material also aids in reducing relatives humidity within to fifty percent. Typically the foamboard is then covered above grade with galvanized lath and about seven-eighths of an inch of stucco or other facing material. In some construction, the foamboard is mounted directly on the framing studs, there being no exterior wall material or sheathing other than the foamboard, the lath, and the exterior coating. If the exterior cladding is not wood, it will extend below grade to cover the foam board.

Another recent development in the construction industry is the use of interlocking hollow rigid foam forms for poured concrete. These forms are typical by modules four feet long, four feet high, and sixteen inches wide. Each module usually has four interconnecting cells for concrete, metallic mesh connectors holding the opposing sides together, and other metal parts for the attachment of interior wall materials and exterior lath. The forms are assembled into the desired shape and are not removed after the concrete is poured, one reason therefor being that the foam is excellent insulation.

The federal government has been providing a tax credit to encourage use of energy-efficient construction systems such as these, and in order to qualify for a credit, rigid insulation board has been required to extend as much as a foot or more below grade. In some parts of the country, local building codes require that the foundation be insulated with rigid foam board below grade. Only recently has it been discovered that although termites cannot digest the foam, they have no trouble chewing their way through it. Once penetrated, moisture which termites need can enter the foam. As a consequence, these new developments in construction have made it much easier for termites to tunnel up to the wood structural members of buildings, undetectable within the foam. Huge new colonies of termites have been built within foamboard and foam concrete forms above ground, there being no longer a need for the termites to return to the soil because everything they need, including a controlled temperature, can be found inside the foam material. Thus there is a need for a termite barrier within these foam construction materials that are accessible to termites.

Heretofore there have been a number of fluid distribution systems for insecticides, comprised of conduit capable of emitting pesticide through apertures or valves, for incorporation in or under a building foundation. Many of these systems are elaborate in construction, requiring extensive modification of traditional and conventional building methods, expensive pumps and reservoirs, and resulting in substantial increases in building costs, as has been previously noted in U.S. Pat. No. 3,513,586 to Meyer et al. Meyer discloses and teaches a distribution system comprising tube means disposed within a building footer constructed of conventional concrete building blocks, requiring additional support members and plate members, among other things, that but for the distribution system, would not be required as part of the footer.

U.S. Pat. No. 3,209,485 to Griffin discloses a pesticide distribution system comprised of multiple, independent, branched circuits, to be installed within and under a foundation. The system comprises many parts and installation requires multiple steps at different stages of construction of the building.

U.S. Pat. No. 3,602,248 to Peacock discloses a distribution system comprised of a plurality of parallel connected pipe branches, each branch thereof short enough so that fluid pressure is maintained along the entire piping, and at least two inlets into each branch. Each branch requires a closure fitting at the end opposite the inlet end. Multiple pumps are required to maintain uniform pressure in the branch lines.

There are a number of related systems for distributing pesticide within the walls of buildings. In the Ramsey U.S. Pat. No. 3,676,949, pipes with emitter nozzles pass through the studs of the walls, with a nozzle disposed between each set of studs. In U.S. Pat. to Bridges et al., U.S. Pat. No. 3,782,026, pipes extend within the walls or alternatively, beneath baseboard moldings on the interior walls, permitting injection of insecticide gas within the walls. In Lundwall, U.S. Pat. No. 4,0228,841, an insecticide storage and pressurizing system is installed in the attic and perforated pipes carry pest control fluid into the building walls. In U.S. Pat. No. 4,742,641 to Cretti, a built-in reservoir is installed in within a building wall and pesticide is distributed whenever the pump is operated, which can be done by a timing device for injecting predetermined amounts at predetermined spaced intervals. U.S. Pat. No. 3,330,062 to Carter is another pest control system utilizing pipes installed through holes drilled through the wall studs of a building. The pipes require threaded caps at the distal ends thereof. U.S. Pat. No. 4,944,110 to Sims is for method of applying pesticide to the concealed areas of a building, utilizing injection of pressurized chemicals into perforated tubing. A divisional application for a related apparatus was filed by Sims.

U.S. Pat. No. 5,347,749 to Chitwood et al. discloses a system for reapplication of termiticide to the fill dirt underlying the foundation slab of a building at potential termite entry points: junction of foundation block with slab, and openings in the slab for penetration of bundles of utility connections. None of the foregoing patents teaches or discloses a system adapted to deliver a termiticide barrier to the exterior walls of a building underneath its surface coating or siding materials, or to foam board used as insulation or foam concrete forms.

Hence it is an object of this invention to provide a delivery system for application of termiticide to form a chemical termite barrier between the exterior coating on the one hand, and the exterior walls and foundation of a building, to prevent termites from building their above-ground tunnels up the exterior walls or through styrofoam forms or board insulation to access wood materials such as sole plates, studs, etc.

SUMMARY OF THE INVENTION

In accordance with the present invention, a peripheral termiticide delivery system of flexible apertured tubing is provided for injection under pressure of termiticide into the space between the outside walls of a building and its exterior surfacing, where it may spread by capillary action over the adjacent surfaces and down into the soil, thereby creating a termite barrier. The tubing preferably has flanges extending therefrom which prevent clogging of the apertures and also facilitate fastening the tubing to the walls around the building slightly above the junction of foundation with the exterior walls. There are several configurations of the flanged tubing, and several ways of installing it, depending on whether it is installed prior to application of the exterior surfacing material or in existing finished construction, and whether the building has rigid foam insulation around the foundation, or is constructed of concrete poured into styrofoam forms. Injection ports for injection of termiticide into the tubing are disposed at intervals along the tubing, which ports are adapted to extend outside the exterior surfacing materials. Termiticide may then be injected under pressure at the various ports until the tubing is filled to overflowing and termiticide exits the apertures and saturates the adjacent wall surfaces.

DETAILED DESCRIPTION OF THE PREFERRED EMBODIMENTS

Figure 1:
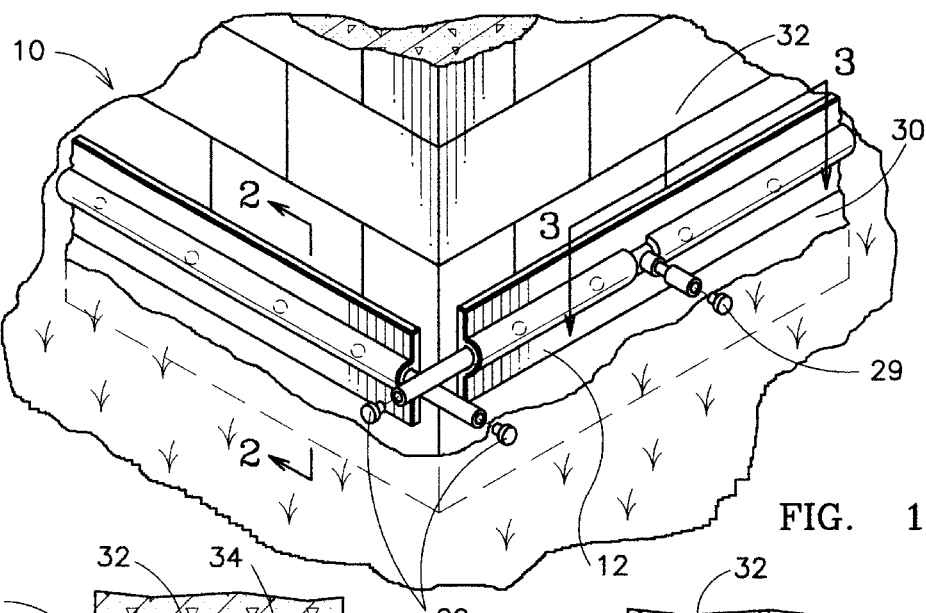
FIG. 1 is a partial perspective view of the invention installed on the walls of a building prior to application of an exterior surfacing material.
Figure 2:
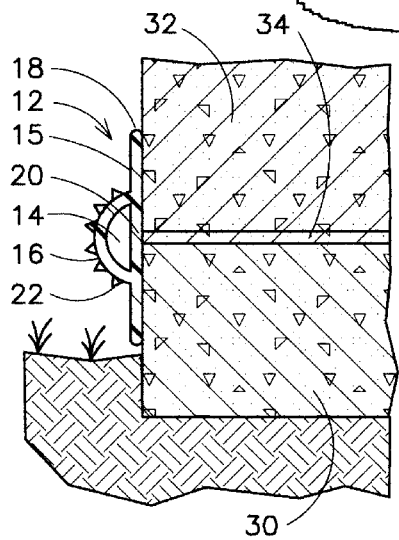
FIG. 2 is a vertical sectional view taken along line 2—2 of FIG. 1.
Figure 3:
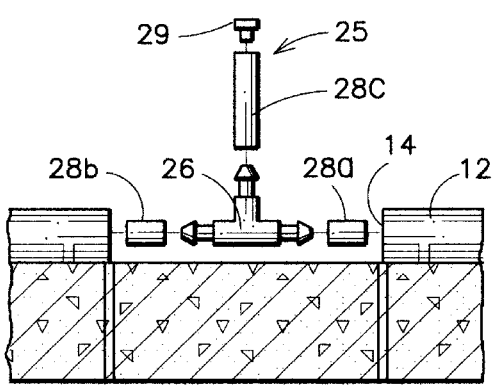
FIG. 3 is a partial, exploded top plan view of the invention together with a cross-sectional view of a building wall taken along lines 3—3 of FIG. 1.
Figure 4:
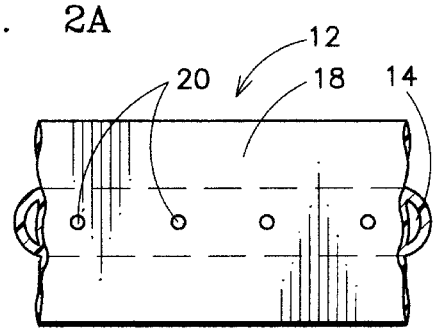
FIG. 4 is a partial back elevational view of the invention.
Figure 5:
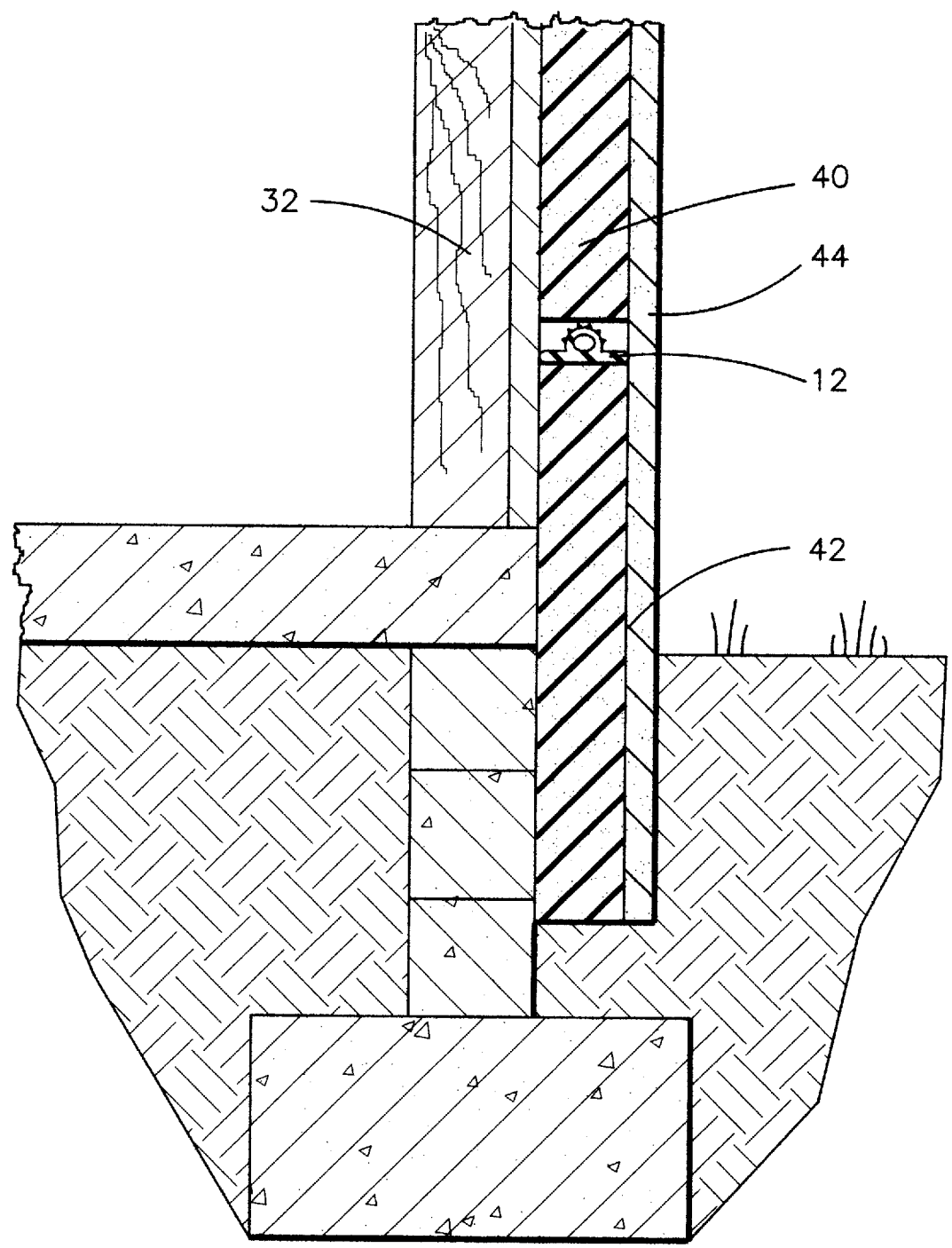
FIG. 5 is a vertical sectional view of the invention installed in a horizontal channel through foam board insulation surrounding a foundation.

Referring to FIGS. 1 through 12 of the drawings, the invention 10 shows a peripheral termiticide delivery system comprised of lengths of ribbon-like tubing means 12 having a central bore 14 co-extensive with each length of tubing means 12, flanges on either side thereof 15, a front surface 16, and a back surface 18. As shown in FIG. 2 bore 14 has the circumferential shape of a small piece of a circle sliced off by a chord, thus having a curved side connected at the ends thereof to the ends of a flat side. The bore could be some other shape, such as oval or round, without changing its function. FIG. 4 shows small apertures 20, through the back surface 18 only, to the central bore 14. FIG. 1 shows tubing 12 affixed to the exterior side of a building at the junction 34 of its foundation slab 30 with exterior walls 32; back surface 18 is adjacent the building, as more particularly shown in FIG. 2. Although walls in the drawings are illustrated as being made of concrete blocks, the invention is appropriate on buildings whose exterior walls are made of other structural materials, such as wood sheathing. The ribbon-like feature of tubing means 12 facilitates attachment and orientation thereof so that the long axes of apertures 16 will be more or less horizontally perpendicular to the walls 32. The flat extensions or flanges serve to prevent stucco material or other or other particulate matter from reaching the apertures and clogging them. This embodiment of the invention may be installed prior to application of exterior facing material, such as stucco, siding, shingles, half-bricks, or stone, to the exterior walls. Horizontal ridges 22 on front surface 16 facilitate adhesion of cement-like materials that will be used to apply facing over the walls 32 after installation of the invention. Double-sided adhesive tape is one of the most convenient means of attaching tubing 12 to a building, but cement staples through the side extensions 15, or other attaching or adhesive means, could also be used. An appropriate site of attachment of tubing means 12 would be at junction 34, but there are situations where it would be more desirable to install the tubing at a level above junction 34, such as in an existing structure where soil has been mounded above the original grade.

As shown in FIG. 3, approximately every fifteen feet, injection ports 25 are disposed between lengths of tubing means 12. Injections ports 25 are comprised of T-shaped tubular three-way connectors 26, each of which interconnects three adapter means 28a, 28b, and 28c, comprised of short lengths of conventional round unperforated flexible tubing, the outside circumference of which matches the circumference of bore 14. The plastic material out of which adapter means 28 are made permits them to deform to fit the shape of bore 14. The two adapter means 28a and 28b connected to the "arms" of the T of connecter 26 are in turn connected to lengths of tubing 12 by insertion into bore 14, and adapter means 28c connected to the "stem" of the T of connector 26 protrudes horizontally outward from and perpendicular to the plane of wall 32. Adapter means 28c is intended to extend outside the finishing facing to be applied to exterior walls 32, and is provided with a removable cap or stopper 29 to prevent entry of matter that would clog any of the tubing elements of this invention.

At outside corners of buildings, the T-shaped connectors 26 are optional but unnecessary. Adapter means 28d are inserted directly into the ends of tubing means 12; likewise they are also of a length to extend outside the finishing facing of walls 32, and are provided with removable stoppers or caps 29. FIGS. 1 and 3 show stoppers, but caps into which the protruding ends of adapters 28c are insertable would serve equally well.

Figure 2A:
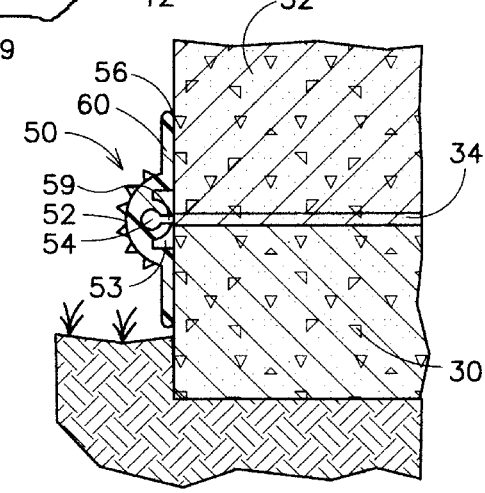
FIG. 2A is like FIG. 2 except that the configuration of the back surface of the tubular member is different.

An alternative to the form of tubing 12 is shown in FIG. 2A as ribbon tubing means 50. The front surface 52 is approximately the same as outer surface 16 of tubing 12. However the back surface 56 of tubing means 50 is indented to form a round circumference for bore 54, instead of the shape of the circumference of bore 14. Back surface 56 also forms pockets 58 extending the length of tubing means 50.

Apertures 59 through back surface 56 to bore 54 are comparable to apertures 16 in tubing 12, are disposed at approximately six-inch intervals. Side extensions 60 of tubing means 50 are comparable to side extensions 15 so that when back surface 56 is affixed along junction 34 of walls 32 with slab 30, the long axes of apertures 59 will be horizontally perpendicular to junction 34. One advantage of using tubing means 50 rather than tubing means 12 is that adapters 28a and 28b are unnecessary at the injection ports 25. T-shaped connectors can directly interconnect two lengths of tubing means 50 with adapter means 28c.

The advantage of the shape of alternate tubing means 50 is that the pockets 58 form reservoirs with the building walls for additional termiticide.

Figure 6:
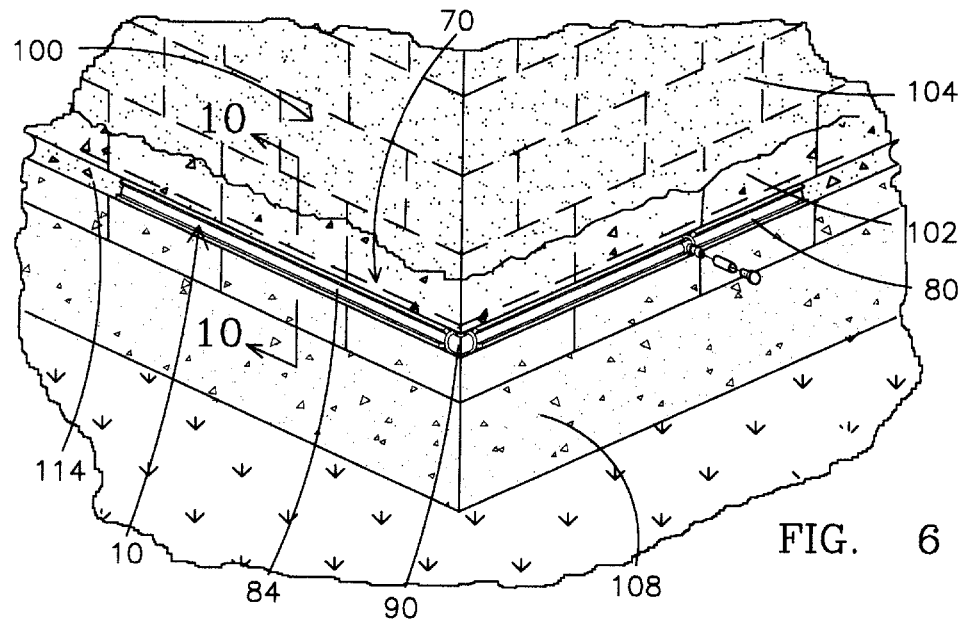
FIG. 6 is a partial perspective view of another embodiment of the invention installed on the walls of a concrete building with pre-existing stucco surface.
Figure 7:
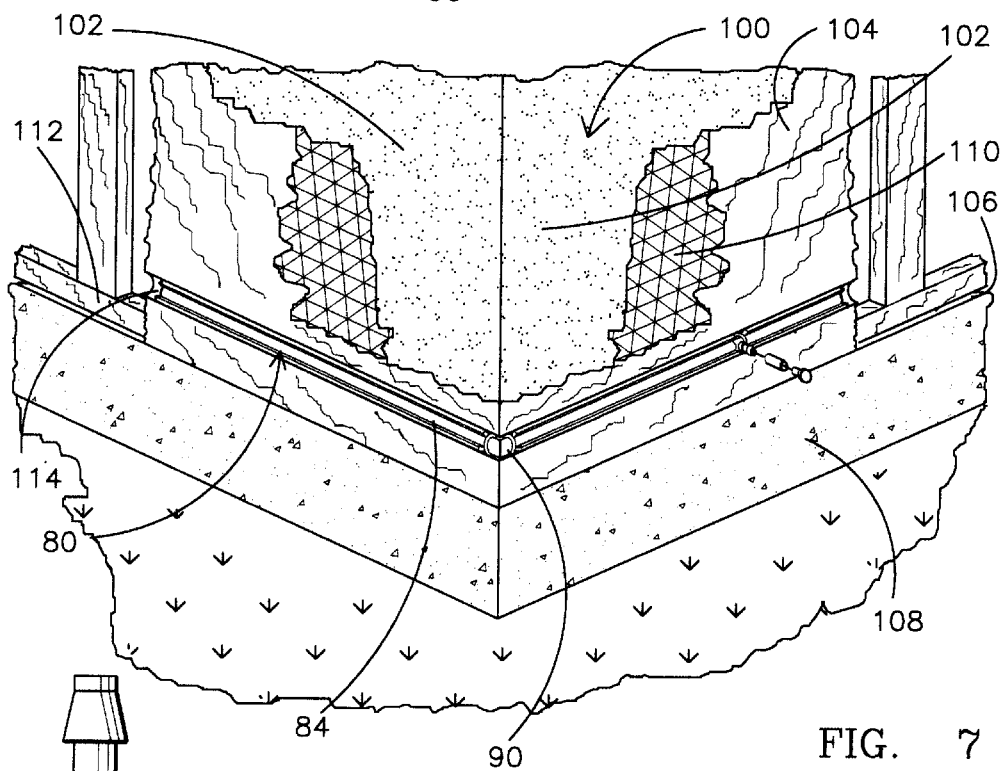
FIG. 7 is a partial perspective view of the invention installed on a wood-framed building with pre-existing stucco surface.
Figure 8:
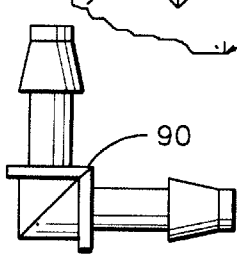
FIG. 8 is a detail of an elbow connector used to connect lengths of the tubing of the embodiment of FIG. 6 at inside and outside corners of a building.
Figure 9:
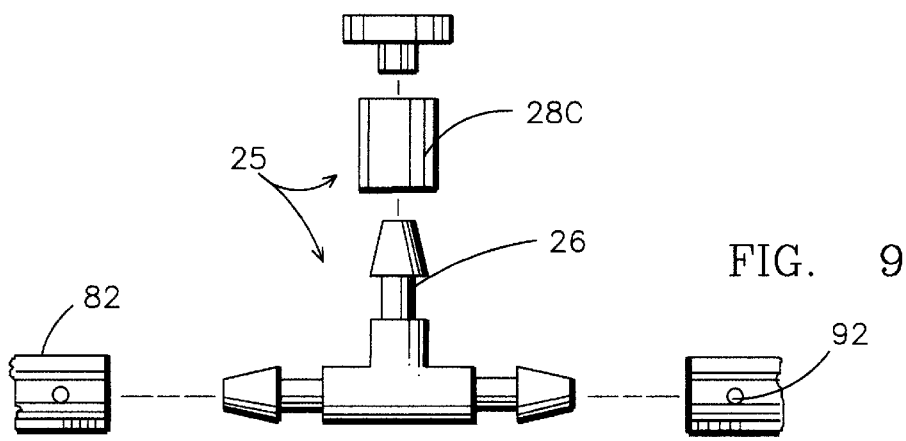
FIG. 9 is a detail view of a combination tubing connector and injection port.

In FIG. 6, foam board insulation 40 is sandwiched between the exterior walls 32 and a surface coating 42. An horizontal slot 44 is cut all the way around the building preferably at about three inches above grade through the coating 42 and the foam board 40 all the way to the wall 32 and the tubing 12 is inserted into the slot 44 with the apertures 20 opening downward. Foam board insulation 40 comes in different thicknesses; tubing 12 should extend over the entire thickness of the foam board in order for it to create an effective barrier. The portion of the slot 44 through coating 42 not filled by tubing 12 should then be refilled with additional coating material.

Figure 12:
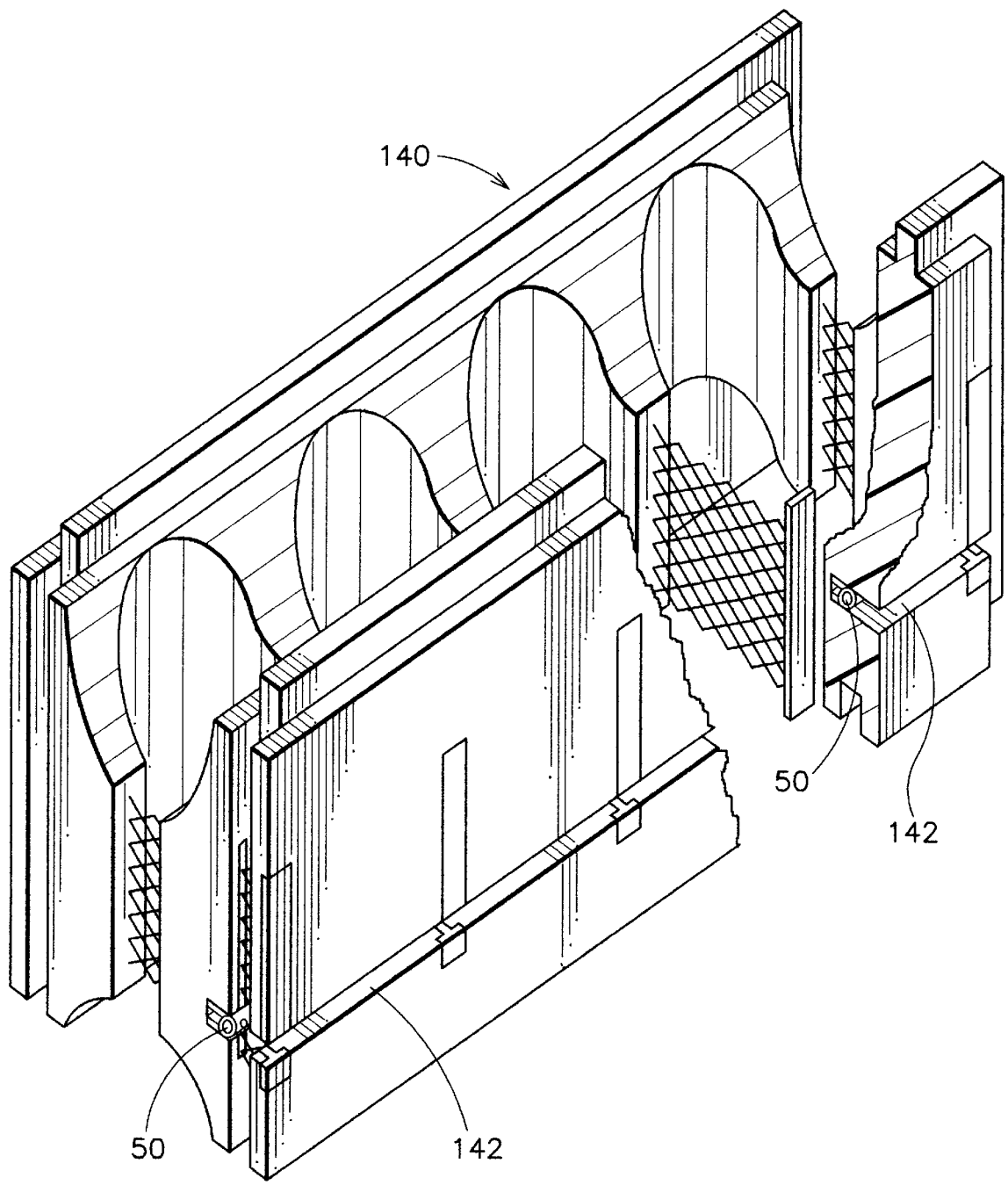
FIG. 12 is a perspective view of a rigid foam concrete form with a horizontal slot in the exterior vertical surface and the tubing means of this invention installed therein.

FIG. 12 depicts a modular concrete form 140 sold by Cope, Inc. of Toccoa, Ga., using the tradename "Polysteel Forms". Form 140 has tubing means 50 installed in a horizontal slot 142 cut into the foam. Slot 142 is of sufficient depth to permit creation of an effective chemical barrier within the foam. Form 140 is shown without any concrete to simplify the drawing for better understanding, but normally the conrete would have been poured into the assembled forms prior to cutting the slot.

Referring to FIGS. 6 through 11 of the drawings, a variant 70 of invention 10 is shown installed around the walls 102 of a building 100 with a pre-existing exterior stucco coating 104. The installation is done by first cutting a more or less U-shaped groove 114 in the exterior coating 110 approximately three inches above grade for a concrete block structure, or three inches above the junction 106 of foundation slab 108 with the wooden sill plate of a wood-framed structure. Groove 114 should extend all the way through the coating which is customarily about five-eighths (0.625) of an inch thick. This embodiment is comprised of sections of tubing means 80 having a back surface 82 and a front surface 84, an internal central bore 86 and at least two integral external flanges 88 co-extensive with each section of tubing means 80, spaced from one another on said front surface 84. Flanges 88, preferably with toothed surfaces, extend from said front surface 84 divergently from each other, terminating at distal edges 89, the distance between said distal edges 89 being greater than the external diameter of a cross-section 81 of tubing sections 80, thereby creating in cross-section a wide-bottomed V shape. The sections 80 are ideally around fifteen feet long, for reasons that will be set forth hereinbelow. Each section 80 of tubing also has small apertures 92 at preferably three-and-three-quarter (3.75) inch intervals spaced in alignment along each section, through back surface 82 only, to the central bore 86. The sections 80 are interconnected end-to-end in much the same manner as tube sections 12 by three-way T-shaped tubular connectors 26, except that adapters 28a and 28b are not required with this configuration of tubing. This is because the shapes of its internal bore is better adapted for sealing engagement of the ends of the connectors 26 than is tubing means 12. Injection port 28 extends outward beyond the vertical plane of the external stucco coating 104. At corners of a building, an L-shaped connector 90 without an arm for an injection port is used in place of a T-connector 26 to connect tubing sections 80.

The tubing sections 80 may be inserted into groove 114 with a splining tool. The outside diameter of the tubing sections 80, not including the flanges, is approximately one-quarter inch, so that when they are installed in accordance with the teachings of this invention, there is a void space 116 behind back surface 62 and the deepest area or nadir 118 of groove 114.

Figure 10:
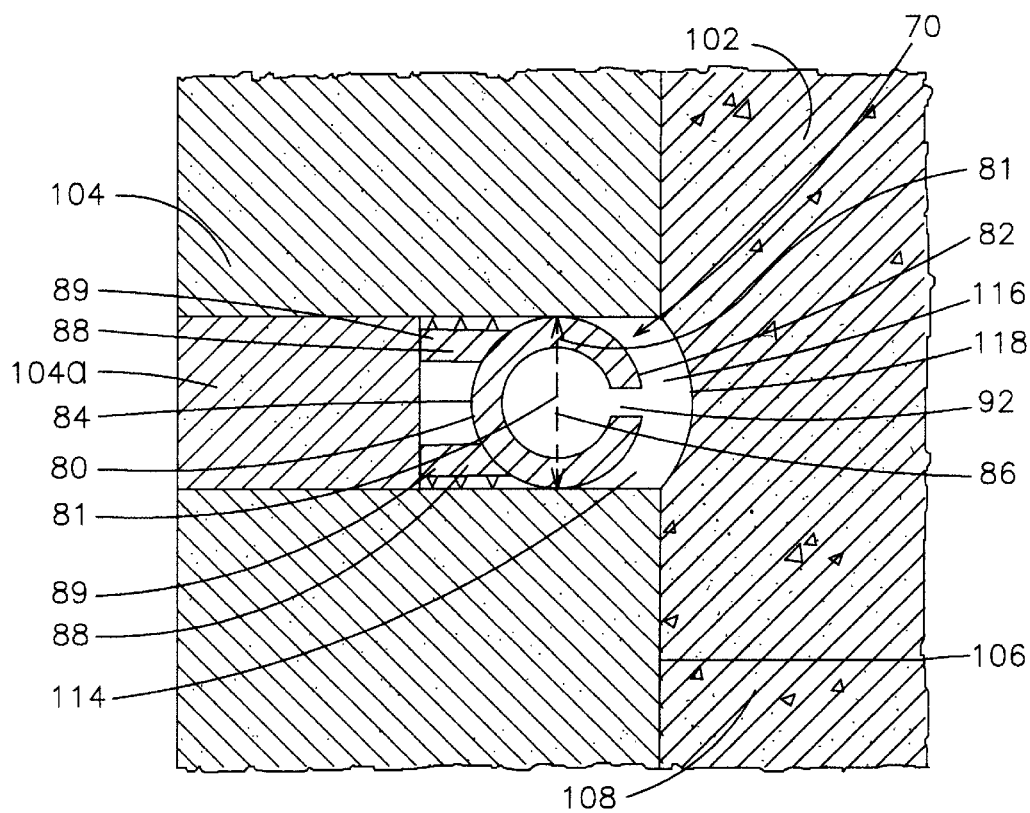
FIG. 10 is a vertical sectional view taken along line 10—10 of FIG. 6.
Figure 11:
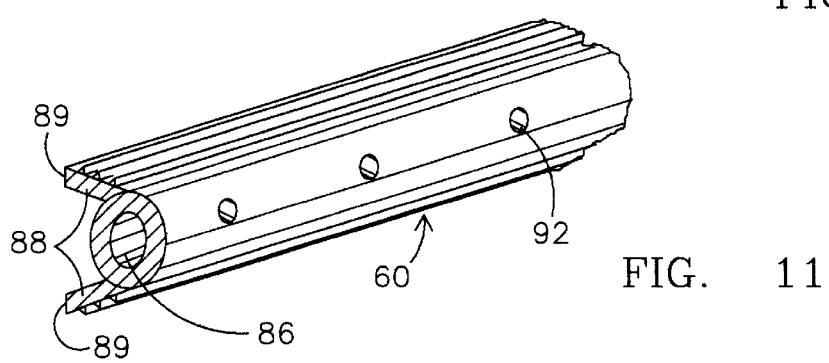
FIG. 11 is a perspective detail view of a portion of the perforated tubing of this invention, showing the back surface.

Tubing sections 80 are oriented in groove 114 so that apertures 92 open to space 116. The width of groove 116 is approximately the same as the outside diameter of tubing sections 80, and less than the distance between distal edges 89 of flanges 88 when undeformed, so that when tubing sections 80 are forced into groove 114, flanges 88 are pressed into a more or less parallel alignment with each other, biased against the sides of groove 114, thereby sealing the void space 116 and holding sections 80 securely in place. Once the system is installed, stucco coating 104a can then be applied over it to recreate the original continuous finish, as shown in FIG. 10, making sure that injection ports 26 protrude beyond the outer surface.

When installing the invention on a wood-framed structure with a pre-existing coating, groove 114 is cut through the metal lath 110 used to provide adherence for the stucco.

To service the delivery system, a pressurized injection means, not shown, of any commercially available type, is provided with a delivery tip, not shown, adapted to inject fluid termiticide into the invention 10 at injection ports 27. Injection of termiticide at one port continues until the fluid is observed squirting out of a nearest-in-line port for several seconds, which phenomenon indicates that a length of tubing means 12, is full, and termiticide is exiting apertures 20. The lengths of tubing means 12 being ideally fifteen feet, the injection ports 27 are accordingly spaced at fifteen foot intervals, which has been found experimentally to be desirable in order to ensure that termiticide will be distributed effectively through all the apertures 22 into the entire length of the void space 116 served by each section of tubing means 12. Because cement and wood are porous, capillary action and porosity will ensure that the termiticide will spread to soak the area between the apertures emitting it. The sealed void space 116 thus forms a reservoir for termiticide. The person injecting the termiticide then proceeds to inject a next-in-line port 26 until all ports have received sufficient termiticide to fill each length of tubing means 12 and to exit the apertures 22 in sufficient quantity to fill the void space 116. Thus a continuous strip of termiticide material extends around the periphery of the building foundation above its juncture with the exterior walls, and behind the exterior facing material, wherever the invention has been installed.

The various embodiments of the invention 10, 50, or 80 as the case may be, are designed to provide a termiticide delivery system for saturation of the surfaces of exterior walls 32 or 102 and foundation 30 or 108 down into the soil. A pressurized injection means, not shown, of any commercially available type, is provided with a delivery tip, not shown, adapted to inject fluid termiticide into tubing means 12, 50 or 80 at injection ports 25. Injection of termiticide at one port continues until the fluid is observed squirting out of a nearest-in-line port for a pre-determined period of time, which phenomenon indicates that a length of tubing means 12, 50 or 82 as the case may be, is full, termiticide is exiting apertures 20, 59, or 92 as the case may be, and running down the adjacent surfaces into the soil. Since cement and wood are somewhat porous, capillary action and porosity will ensure that the termiticide will spread to soak the surface areas between the apertures emitting it. Tubing means 50 and 82 provide additionally a continuous reservoir of termiticide up against the walls 32 or 102 The person injecting the termiticide then proceeds to inject a next-in-line port until all ports have received sufficient termiticide to fill each length of tubing means and to exit the apertures 20, 59, or 92 in sufficient quantity to soak the adjacent surfaces and run down into the soil. Thus a continuous strip of chemical termite barrier extends around the periphery of the building foundation beneath or behind the exterior cladding and down into the soil, wherever the invention has been installed.

Various changes and departures may be made to the invention without departing from the spirit and scope thereof. Thus it is not intended that the invention be limited to what is described in the specification and illustrated in the drawings, rather only as set forth in the claims.

What is claimed is:

1. In combination with a building having a foundation and exterior walls clad with an exterior coating, a peripheral termiticide distribution system comprising:

flexible resilient tube means disposed around the exterior walls of the building above ground level and under said exterior coating, said tube means having a plurality of apertures spaced along a first surface thereof;

a plurality of injection port means spaced along a second surface of said tube means, each said port means having a distal injection end extending outside said exterior coating; and an integral flange extending along a third surface of said tube means, said flange comprising means to prevent exterior coating materials from clogging said apertures, and further comprising means for attaching said tube means to said exterior walls, whereby termiticide may be injected through said distal end of said injection port means into said tube means and distributed through said apertures to soak and run down the adjacent exterior walls into the ground, forming a chemical termite barrier between said exterior coating and said exterior walls and foundation, and in the soil adjacent thereto.

2. In combination with a building having a foundation and exterior walls clad with an exterior coating, a peripheral termiticide distribution system comprising:

flexible resilient tube means disposed on said exterior walls above ground level and under said exterior coating, said tube means having a plurality of apertures spaced along a first surface of said tube means; and a plurality of injection port means spaced along a second surface of said tube means and connecting therewith, each port means having a distal injection end extending outside said exterior coating; whereby termiticide may be injected at said distal end of said injection port means into said tube means and distributed through said apertures to soak and run down said adjacent exterior walls into the ground, forming a chemical termite barrier between said exterior coating and said exterior walls and the soil adjacent thereto.

3. The system according to claim 2 wherein said tubing means further comprises means to prevent clogging of said apertures with particulate matter, and means for affixing said tube means to said exterior walls.

4. The system according to claim 3 wherein said means to prevent clogging and means for affixing said tube means comprise an integral flange extending along a third surface of said tube means.

5. The system according to claim 4 wherein said apertures are disposed in straight alignment on said first side and said tube means has a channel extending the length thereof between said integral flange and said alignment of said apertures, whereby said channel in combination with said exterior walls comprises a reservoir for termiticide.

6. In combination with a building clad with an exterior coating on its exterior walls and having foam material sandwiched between said walls and said coating, a peripheral termiticide distribution system comprising:

a groove extending horizontally into said foam above ground level;

flexible resilient tube means disposed in said groove under said exterior coating, said tube means having a plurality of apertures spaced along a first surface thereof; and a plurality of injection port means spaced along a second surface of said tube means, each port means having a distal injection end extending outside said exterior coating;

whereby termiticide may be injected at said distal end of said injection port means into said tube means and distributed through said apertures to soak and run down the surface of said foam into the ground, forming a chemical termite barrier between said exterior coating and said exterior walls, and in the soil adjacent thereto.

7. A method of preventing termites from building tunnels from the underlying soil up between the exterior coating and the exterior walls of a building, using a tube delivery system, said delivery system comprised of:

flexible resilient tube means having a plurality of apertures spaced along a first surface thereof; and a plurality of injection port means spaced along a second surface thereof, each port means having a distal injection end;

said method comprising the following steps:

affixing said tube delivery system to said exterior walls of a building under said exterior coating above ground level, so that said distal injection ends of said ports extend outside said exterior coating and said apertures are adjacent said exterior walls;

injecting a termiticide substance through said distal end of each said injection ports into said tube delivery system until said system is filled to overflowing with termiticide substance, and said substance soaks the surfaces of said exterior walls adjacent said tube delivery system, runs down said walls and foundation, and into the soil adjacent thereto.

8. The method according to claim 7 wherein said delivery system is further comprised of:

an integral flange along a third surface of said tube means, said flange comprising means to protect clogging of said apertures by particulate matter, and said flange further comprising means for attaching said tube means to said exterior walls.

9. The method according to claim 8 wherein said tube delivery system further comprises:

a channel extending the length of said tube means spaced between said flange and said apertures.

10. A method of preventing termites from building tunnels from the underlying soil up through foam material sandwiched between an exterior coating and the exterior framework of a building, using a tube delivery system, said delivery system comprised of:

flexible resilient tube means having a plurality of apertures spaced along a first surface thereof; and a plurality of injection port means spaced along a second surface thereof each port means having a distal injection end;

said method comprised of the following steps:

forming a horizontal groove in said foam insulation above ground level;

inserting said tube means in said groove so that said apertures open into said groove and said distal injection ends of said ports extend outside said exterior coating;

injecting a termiticide substance through said distal end of each said injection ports into said tube delivery system until said system is filled to overflowing with termiticide, and termiticide soaks adjacent surfaces and runs down the foamboard and foundation and into the soil adjacent thereto.

11. The method according to claim 10 wherein said tube means further comprises an integral flange extending along a third surface of said tube means, said flange comprising means to protect said apertures from becoming clogged with particulate matter.

* * * * *